US009117419B2

(12) United States Patent
Wang

(10) Patent No.: US 9,117,419 B2
(45) Date of Patent: Aug. 25, 2015

(54) GATE DRIVER AND LIQUID CRYSTAL DISPLAY DEVICE

(71) Applicant: Shenzhen China Star Optoelectronics Technology Co., Ltd., Shenzhen, Guangdong (CN)

(72) Inventor: Nianmao Wang, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 255 days.

(21) Appl. No.: 13/811,916

(22) PCT Filed: Jan. 17, 2013

(86) PCT No.: PCT/CN2013/070631
§ 371 (c)(1),
(2) Date: Jan. 24, 2013

(87) PCT Pub. No.: WO2014/110769
PCT Pub. Date: Jul. 24, 2014

(65) Prior Publication Data

US 2014/0198273 A1 Jul. 17, 2014

(30) Foreign Application Priority Data

Jan. 15, 2013 (CN) .......................... 2013 1 0014426

(51) Int. Cl.
*G02B 27/00* (2006.01)
*G09G 3/36* (2006.01)

(52) U.S. Cl.
CPC ............ *G09G 3/3677* (2013.01); *G09G 3/3659* (2013.01); *G09G 2310/0286* (2013.01)

(58) Field of Classification Search
CPC ........................................................ G02B 27/00
USPC ........... 345/208, 102, 55, 691, 74.1, 75.2, 76, 345/77, 82, 90, 94, 96; 349/33
See application file for complete search history.

(56) References Cited

U.S. PATENT DOCUMENTS

2008/0158204 A1* 7/2008 Chang et al. .................. 345/204

FOREIGN PATENT DOCUMENTS

CN 101587752 A 11/2009
CN 101727859 A 6/2010

* cited by examiner

*Primary Examiner* — Amare Mengistu
*Assistant Examiner* — Shawna Stepp Jones
(74) *Attorney, Agent, or Firm* — Andrew C. Cheng

(57) ABSTRACT

The present invention provides a gate driver and liquid crystal display device. The gate driver, for driving scan lines of liquid crystal display device, includes: an input buffer, for receiving clock signal, first frame start pulse signal and second frame start pulse signal; shift register, including n+2 triggers, connected serially from the first trigger to the n+1$^{st}$ trigger, a clock signal input terminal of the n+2$^{nd}$ trigger being connected to the clock signal transmission line, wherein n being a natural number, when the first frame start pulse signal starting, the shift register shifting vertical synchronization signal and outputting n+1 outputs of shift registers based on the clock signal; a voltage level shifter, for shifting the output of the shift register to predefined voltage level and outputting shifted result serially; and an output buffer, for applying output of voltage level shifter to scan lines.

8 Claims, 5 Drawing Sheets

GATE DRIVER AND LIQUID CRYSTAL DISPLAY DEVICE

BACKGROUND OF THE INVENTION

1. Field of the Invention

The present invention relates to the field of liquid crystal displaying techniques, and in particular to a gate driver and liquid crystal display device.

2. The Related Arts

To solve the problem of color shift at large view angle in large-size thin film transistor liquid crystal display device (TFT-LCD), a low color shift (LCS) technique is often used. FIG. 1 is a schematic view showing the known driver of LCS liquid crystal display device. The LCS liquid crystal display device is usually large-size full high definition (FHD) TFT-LCD. LCD 1 usually comprises a display panel 2, source drivers SD1, SD2, . . . , SD6, gate drivers GD1, GD2, GD3, GD4, a timing controller 3, on a control board 4. The control board 4 is connected to driver board (X board) through flexible bus FFC so that the timing controller 3 can provide control signals to the source drivers SD1, SD2, . . . , SD6. FIG. 2 is a schematic view showing the structure of the internal circuit of the display panel surrounded by the dash lines. The LCS structure demands that the total number of output channels of a plurality of gate drivers disposed in a cascade manner at one side of the display panel is more than the total number of rows displayed by the TFT-LCD by one. The number of rows of pixels displayed by FHD TFT-LCD is 1080, which results in a total of 1081 output channels of the plurality of gate drivers. The number of output channels of known gate drivers is usually divisible factor of 1080, such as, 270 output channels, 360 output channels, or 540 output channels. As a result, four 270-channel gate drivers, three 360-channel gate drivers or two 540-channel gate drivers can be cascaded to form 1080 output channels. However, the above configurations cannot support the last, i.e., the $1081^{st}$ scan line driving of the LCS in FIG. 2. A known method uses an additional gate driver to drive the $1081^{st}$ scan line, and the extra output channels in the additional gate driver are all wasted. In addition, the numbers of the output channels in each of the cascaded gate drivers will be different, which also complicates the setting of the voltage levels of the related pins of the output channels of gate drivers.

SUMMARY OF THE INVENTION

The present invention provides a gate driver, for driving scan lines of liquid crystal display device. The gate driver comprises: an input buffer, for receiving clock signal, first frame start pulse signal and second frame start pulse signal; shift register, comprising n+2 triggers, connected serially from the first trigger to the $n+1^{st}$ trigger, a clock signal input terminal of the $n+2^{nd}$ trigger being connected to the clock signal transmission line, wherein n being a natural number, when the first frame start pulse signal starting, the shift register shifting vertical synchronization signal and outputting n+1 outputs of shift registers based on the clock signal; a voltage level shifter, for shifting the output of the shift register to predefined voltage level and outputting shifted result serially; and an output buffer, for applying the output of the voltage level shifter to the scan lines.

According to a preferred embodiment of the present invention, the clock signal comprises n+1 clock signal pulses, wherein the falling edge of the n-th clock signal pulse triggers the $n+1^{st}$ trigger and outputs the second frame start pulse signal, and the rising edge of the $n+1^{st}$ clock signal pulse triggers the $n+2^{nd}$ trigger and outputs the output of the $n+1^{st}$ shift register.

According to a preferred embodiment of the present invention, the natural number n is 540.

The present invention provides a liquid crystal display device, which comprises: a display panel, further comprising 2n rows of pixels and 2n+1 scan lines, n being a natural number, wherein each two adjacent scan lines driving a row of pixels; a plurality of source drivers, for receiving clock signal and a plurality of level synchronization signal pulses to control and drive the 2n rows of pixels; a plurality of gate drivers, for selectively driving the 2n+1 scan lines of the display panel, the gate driver further comprising: an input buffer, for receiving clock signal, first frame start pulse signal and second frame start pulse signal; shift register, comprising n+2 triggers, connected serially from the first trigger to the $n+1^{st}$ trigger, a clock signal input terminal of the $n+2^{nd}$ trigger being connected to the clock signal transmission line, when the first frame start pulse signal starting, the shift register shifting vertical synchronization signal and outputting n+1 outputs of shift registers based on the clock signal; a voltage level shifter, for shifting the output of the shift register to predefined voltage level and outputting shifted result serially; and an output buffer, for applying the output of the voltage level shifter to the scan lines.

According to a preferred embodiment of the present invention, the first gate driver and the second gate driver are located on one side of the display panel, and the third gate driver and the fourth gate driver are located on the other side of the display panel; wherein the second gate driver and the fourth gate driver are connected to the first to the n-th scan lines and drive one of the first to the n-th scan lines; the first gate driver and the third gate driver are connected to the $n+1^{st}$ to the $2n+1^{st}$ scan lines and drive one of the $n+1^{st}$ to the $2n+1^{st}$ scan lines.

According to a preferred embodiment of the present invention, the clock signal comprises n+1 clock signal pulses, wherein the falling edge of the n-th clock signal pulse triggers the $n+1^{st}$ trigger and outputs the second frame start pulse signal, and the rising edge of the $n+1^{st}$ clock signal pulse triggers the $n+2^{nd}$ trigger and outputs the output of the $n+1^{st}$ shift register.

According to a preferred embodiment of the present invention, the natural number n is 540.

Based on the gate driver and the liquid crystal display device of the present invention, through changing the number of the triggers and the connection manner, the number of the output channels of the gate driver can be arbitrarily increased or decreased so that the gate driver can scan any number of scan lines in the LCD and the gate driver and the known gate driver have the same universality.

BRIEF DESCRIPTION OF THE DRAWINGS

To make the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort. In the drawings.

DETAILED DESCRIPTION OF THE PREFERRED EMBODIMENTS

For description of the technical means and result of the present invention, the following refers to the drawings and embodiments for detailed description, wherein the same number indicates the same part.

Figure 1:
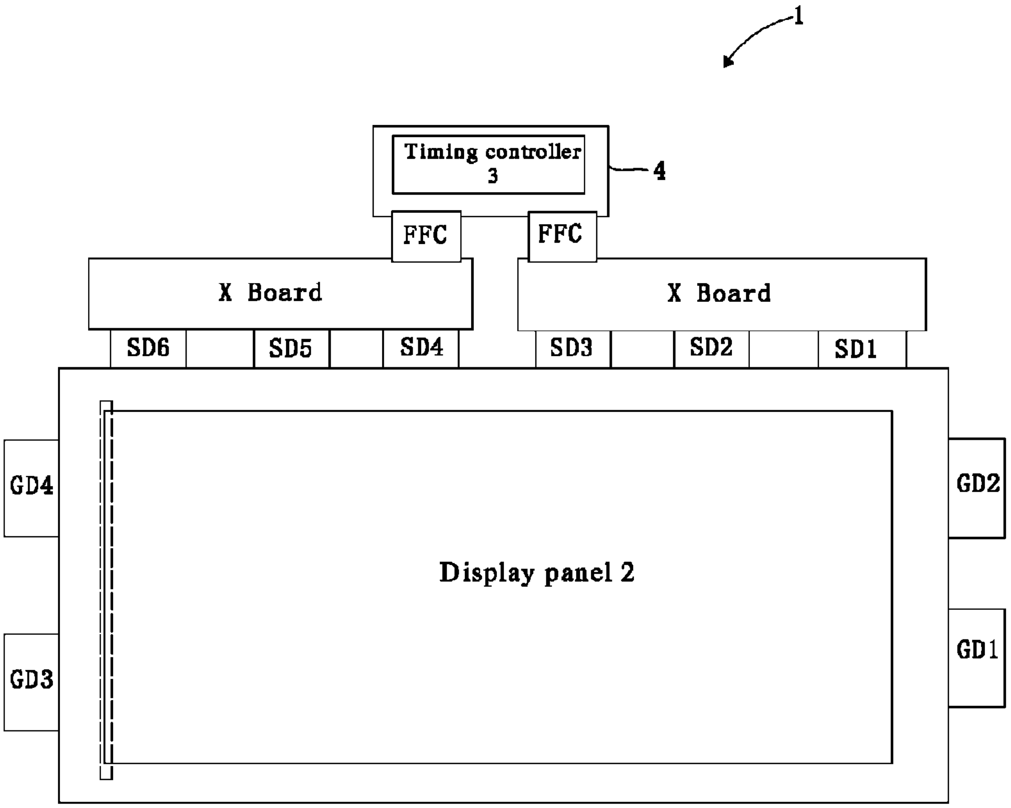
FIG. 1 is a schematic view showing the known driver of LCS liquid crystal display device.
Figure 2:
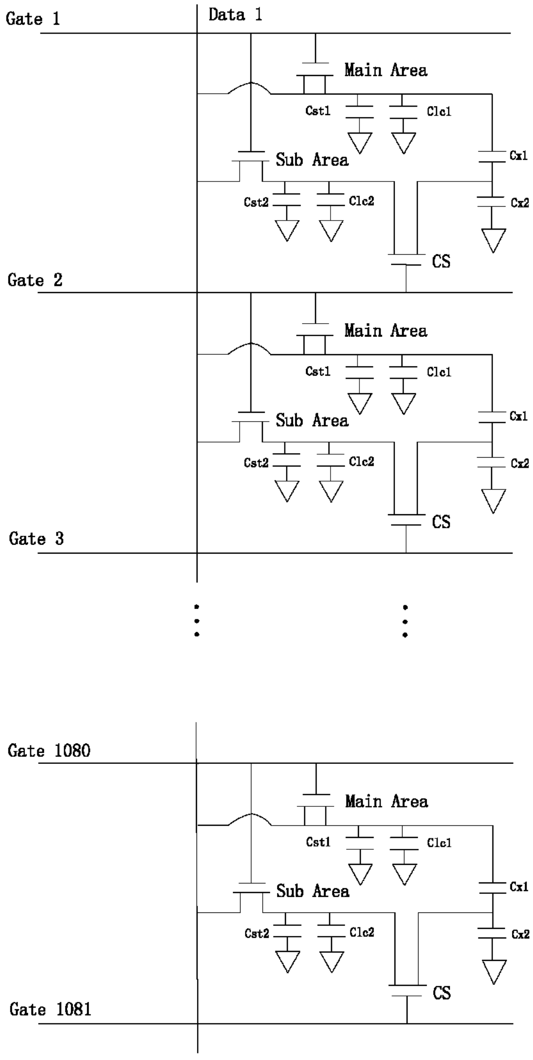
FIG. 2 is a schematic view showing the structure of the internal circuit of the display panel surrounded by the dash lines.
Figure 3:
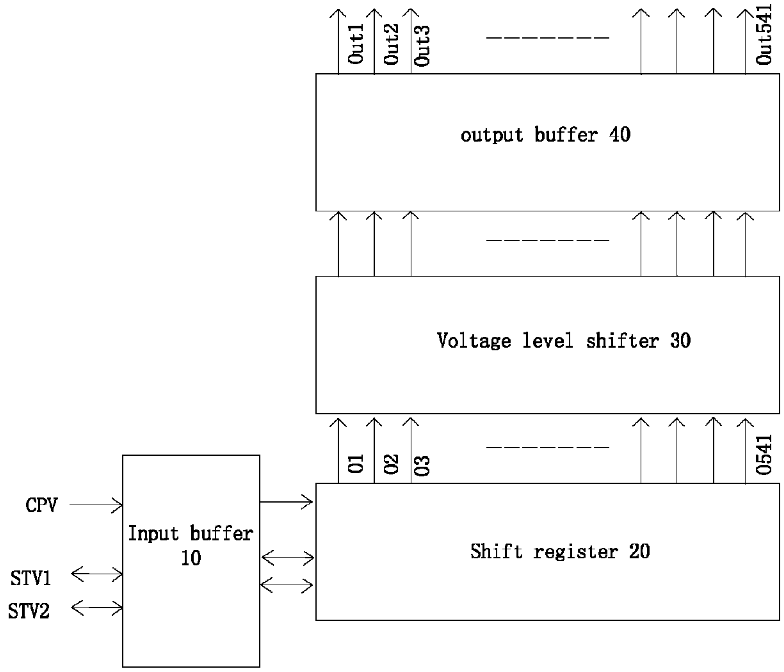
FIG. 3 is a schematic view showing the module of the gate driver according to an embodiment of the present invention.
Figure 4:
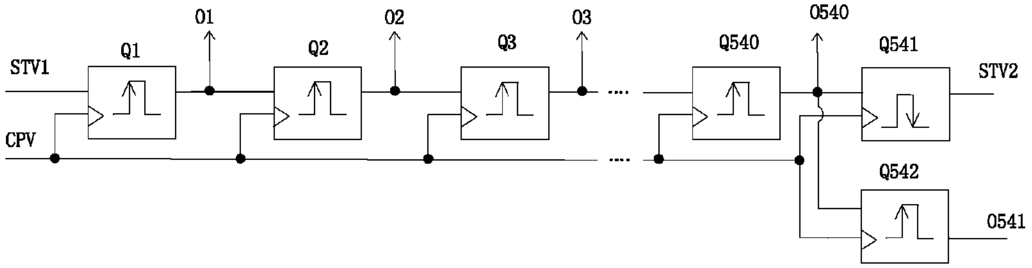
FIG. 4 is a schematic view showing the circuit structure of the shifter register according to an embodiment of the present invention.

FIG. 3 is a schematic view showing the module of the gate driver according to an embodiment of the present invention; FIG. 4 is a schematic view showing the circuit structure of the shifter register according to an embodiment of the present invention; and FIG. 5 is a timing diagram of the shifter register according to an embodiment of the present invention.

Figure 5:
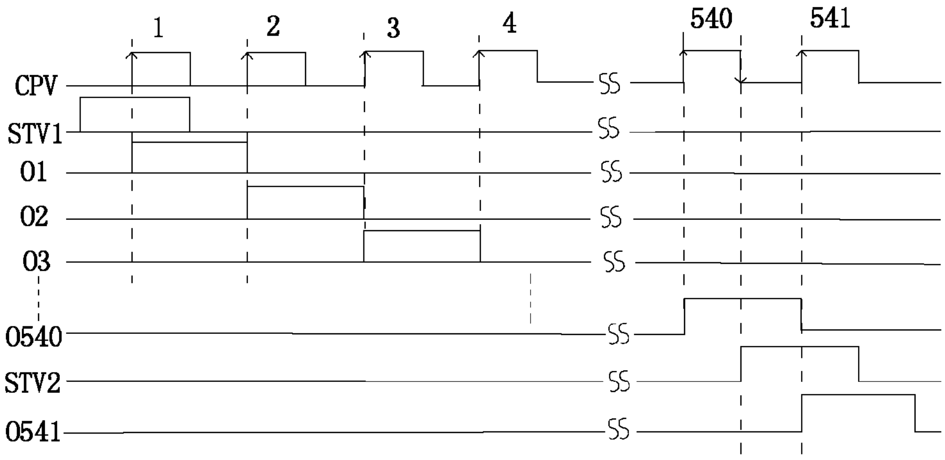
FIG. 5 is a timing diagram of the shifter register according to an embodiment of the present invention.

Referring to FIGS. 3-5, the gate driver 100 comprises an input buffer 10, a shift register 20, a voltage level shifter 30 and an output buffer 40. Specifically, the shift register 20 comprises 542 triggers. But the number is only illustrative, instead of restrictive. The shift register can comprise any number of triggers, depending on actual application. The 542 triggers are labeled as Q1, Q2, Q3, . . . , Q541, Q542, wherein triggers Q1, Q2, Q3, . . . , Q541 are serially connected. In other words, the clock signal input terminal of each trigger is connected to the CPV transmission line; the trigger signal input terminal of trigger Q1 is for receiving the first frame start pulse signal; and the trigger signal input terminal of each of the triggers Q2, Q3, . . . , Q541 is connected respectively to the output terminal of the previous trigger. The trigger signal input terminal of trigger Q542 is connected to the output terminal of the trigger Q540, and the clock signal input terminal of the trigger 542 is connected to CPV transmission line.

In the instant embodiment, the input buffer 10 is for receiving the clock signal CPV, the first frame start pulse signal STV1 and the second frame start pulse signal STV2. When the first frame start pulse signal STV1 starts, the shift register 20 moves vertical synchronization pulse signal based on the clock signal PCV. Specifically, the clock signal comprises 541 clock signal pulses, namely, CPV1, CPV2, CPV3, CPV4, . . . , CPV540, CPV541, wherein CPV1, CPV2, CPV3, CPV4, . . . , CPV540 triggers corresponding triggers Q1, Q2, Q3, . . . , Q540 respectively at rising edge to output outputs O1, O2, O3, . . . , O540 of the shift register; the falling edge of the CPV540 triggers the trigger 541 to output the second frame start pulse signal STV2; and the rising edge of CPV541 triggers the trigger 542 to output the output O541 of the shift register. The voltage level shifter 30 shifts each of the shift register outputs to predefined voltage level, and serially outputs the shifted voltage level. The output buffer 40 serially applies the outputs of the voltage level shifter to the scan lines through output channels Out1, Out2, Out3, . . . , Out541.

Figure 6:
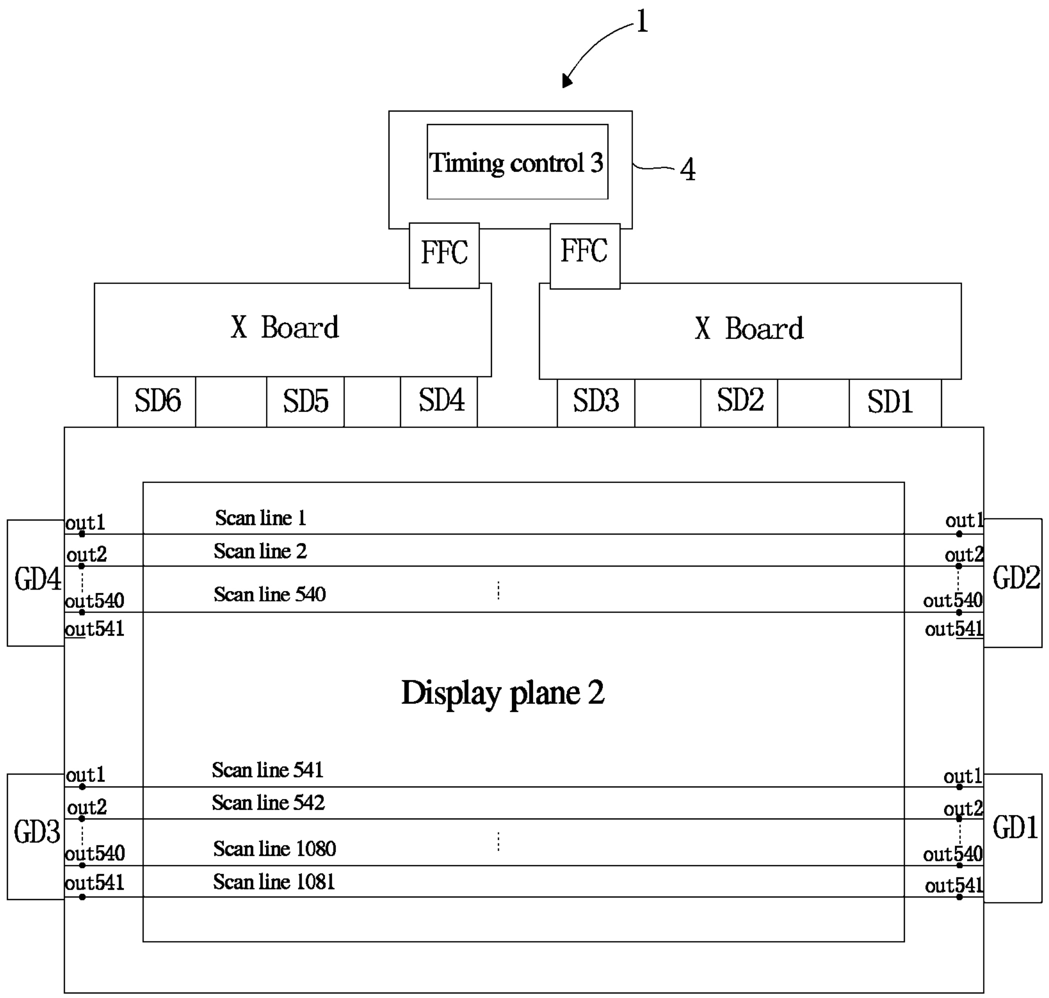
FIG. 6 is a schematic view showing the driving of the liquid crystal display device according to an embodiment of the present invention.

The gate driver of the instant embodiment is sued for driving the scan lines in liquid crystal display device. FIG. 6 is a schematic view showing the driving of the liquid crystal display device according to an embodiment of the present invention.

Referring to FIG. 4 and FIG. 6, the liquid crystal display device 1 comprises a display panel 2, source drivers SD1, SD2, . . . , SD6, gate drivers GD1, GD2, GD3, GD4, timing controller 3 on a control board 4. It should be noted that the gate drivers GD1, GD2, GD3, GD4 are all the aforementioned gate drivers. The control board 4 is connected to driver board (X board) so that the timing controller 3 can provide control signals to source drivers SD1, SD2, . . . , SD6.

In the instant embodiment, the resolution of the display panel 2 can be 1920*1080, i.e., 1080 rows of pixels. The 1080 rows of pixels are driven by 1081 scan lines. In other words, each two adjacent scan lines drive a row of pixels. The scan lines are, namely, scan line 1, scan line 2, scan line 3, . . . , scan line 540, scan line 541, scan line 542, . . . , scan line 1080, scan line 1081. The source drivers SD1, SD2, . . . , SD6 receive clock signal CPV and respective level synchronization signal pulse to supply pixel voltage to any row of pixel of the 1080 rows of pixels.

The gate driver GD1 driver and the gate driver GD2 are located on one side of the display panel 2, and the gate driver GD3 and the gate driver GD4 are located on the other side of the display panel 2. In the instant embodiment, the gate driver GD1 driver and the gate driver GD2 are located on the right side of the display panel 2, and the gate driver GD3 and the gate driver GD4 are located on the left side of the display panel 2. The output channels Out1, Out2, Out3, . . . , Out540 of the gate driver GD2 are connected to the right ends of scan line 1, scan line 2, scan line 3, . . . , scan line 540; and the output channels Out1, Out2, Out3, . . . , Out540 of the gate driver GD4 are connected to the left ends of scan line 1, scan line 2, scan line 3, . . . , scan line 540. The output channels Out541 of the gate drivers GD2, GD4 are not connected to any scan line of the display panel 2. As such, any row of the first to the $540^{th}$ rows of pixels is driven by the gate drivers GD2, GD4 simultaneously, and any row of pixels is supplied with the pixel voltages by the source drivers SD1, SD2, . . . , SD6. The output channels Out1, Out2, Out3, . . . , Out540, Out541 of the gate driver GD1 are connected to the right ends of scan line 541, scan line 542, . . . , scan line 1080, scan line 1081; and the output channels Out1, Out2, Out3, . . . , Out540, Out541 of the gate driver GD3 are connected to the left ends of scan line 541, scan line 542, . . . , scan line 1080, scan line 1081. As such, any row of the $541^{st}$ to the $1080^{th}$ rows of pixels is driven by the gate drivers GD1, GD3 simultaneously, and any row of pixels is supplied with the pixel voltages by the source drivers SD1, SD2, . . . , SD6. As such, after gate drivers GD2, GD4 simultaneously drive scan line 540, i.e., the rising edge of CPV540 makes the output buffer 40 of the gate drivers GD2, GD4 supply the outputs of respective voltage level shifter to scan line 540 through output channel Out540, the falling edge of the CPV540 triggers the outputting of the second frame start pulse signal STV2 as the frame start pulse signal of gate drivers GD1, GD3 so that the display panel 2 can fully display the full high definition.

Based on the gate driver and the liquid crystal display device of the present invention, through changing the number of the triggers and the connection manner, the number of the output channels of the gate driver can be arbitrarily increased or decreased so that the gate driver can scan any number of scan lines in the LCD and the gate driver and the known gate driver have the same universality.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the claims of the present invention.

What is claimed is:

1. A gate driver, for driving scan lines of liquid crystal display device, which comprises:

an input buffer, for receiving clock signal, first frame start pulse signal and second frame start pulse signal;

a shift register, comprising n+2 triggers, connected serially from the first trigger to the n+1$^{st}$ trigger, a clock signal input terminal of the n+2$^{nd}$ trigger being connected to the clock signal transmission line, wherein n being a natural number, when the first frame start pulse signal starting, the shift register shifting vertical synchronization signal and outputting n+1 outputs of shift registers based on the clock signal;

a voltage level shifter, for shifting the output of the shift register to predefined voltage level and outputting shifted result serially; and an output buffer, for applying the output of the voltage level shifter to the scan lines;

wherein the clock signal comprises n+1 clock signal pulses, wherein the falling edge of the n-th clock signal pulse triggers the n+1$^{st}$ trigger and outputs the second frame start pulse signal, and the rising edge of the n+1$^{st}$ clock signal pulse triggers the n+2$^{nd}$ trigger and outputs the output of the n+1$^{st}$ shift register.

2. The gate driver as claimed in claim 1, wherein the natural number n is 540.

3. A liquid crystal display device, which comprises:

a display panel, further comprising 2n rows of pixels and 2n+1 scan lines, n being a natural number, wherein each two adjacent scan lines driving a row of pixels;

a plurality of source drivers, for receiving clock signal and a plurality of level synchronization signal pulses to control and drive the 2n rows of pixels;

a plurality of gate drivers, for selectively driving the 2n+1 scan lines of the display panel, wherein the gate driver further comprising:

an input buffer, for receiving clock signal, first frame start pulse signal and second frame start pulse signal;

a shift register, comprising n+2 triggers, connected serially from the first trigger to the n+1$^{st}$ trigger, a clock signal input terminal of the n+2$^{nd}$ trigger being connected to the clock signal transmission line, when the first frame start pulse signal starting, the shift register shifting vertical synchronization signal and outputting n+1 outputs of shift registers based on the clock signal;

a voltage level shifter, for shifting the output of the shift register to predefined voltage level and outputting shifted result serially; and an output buffer, for applying the output of the voltage level shifter to the scan lines.

4. The liquid crystal display device as claimed in claim 3, wherein the first gate driver and the gate second driver are located on one side of the display panel, and the gate third driver and the gate fourth driver are located on the other side of the display panel; wherein the second gate driver and the fourth gate driver are connected to the first to the n-th scan lines and drive one of the first to the n-th scan lines; the first gate driver and the third gate driver are connected to the n+1$^{st}$ to the 2n+1$^{st}$ scan lines and drive one of the n+1$^{st}$ to the 2n+1$^{st}$ scan lines.

5. The liquid crystal display device as claimed in claim 4, wherein the natural number n is 540.

6. The liquid crystal display device as claimed in claim 3, wherein the clock signal comprises n+1 clock signal pulses, wherein the falling edge of the n-th clock signal pulse triggers the n+1$^{st}$ trigger and outputs the second frame start pulse signal, and the rising edge of the n+1$^{st}$ clock signal pulse triggers the n+2$^{nd}$ trigger and outputs the output of the n+1$^{st}$ shift register.

7. The liquid crystal display device as claimed in claim 6, wherein the natural number n is 540.

8. The liquid crystal display device as claimed in claim 3, wherein the natural number n is 540.

* * * * *